United States Patent [19]

Baker

[11] Patent Number: 4,565,482

[45] Date of Patent: Jan. 21, 1986

[54] WHEELCHAIR DOCKAGE AND STORAGE SYSTEM

[75] Inventor: Gary W. Baker, Troy, Mich.

[73] Assignee: Autodynamics Corporation of America, Madison Heights, Mich.

[21] Appl. No.: 427,507

[22] Filed: Nov. 22, 1982

[51] Int. Cl.[4] .......... B60P 1/48

[52] U.S. Cl. .......... 414/462; 297/DIG. 4; 414/786; 414/921

[58] Field of Search .......... 414/462, 786, 921; 280/242 WC, 289 WC, 650; 297/DIG. 4

[56] References Cited

U.S. PATENT DOCUMENTS

| | | | |
|---|---|---|---|
| 3,910,432 | 10/1975 | Browne et al. . | |
| 4,015,725 | 4/1977 | Ryan et al. . | |
| 4,236,860 | 12/1980 | Gottlieb et al. | 414/462 |
| 4,242,030 | 12/1980 | Clement | 414/462 |
| 4,376,611 | 3/1983 | Koop | 414/462 |

FOREIGN PATENT DOCUMENTS

| | | | |
|---|---|---|---|
| 2480115 | 10/1981 | France | 414/462 |

*Primary Examiner*—Leslie J. Paperner

*Attorney, Agent, or Firm*—Gerald E. McGlynn, Jr.

[57] ABSTRACT

An assembly for raising and collapsing a wheelchair having collapsible legs including a first arm having a first hook at the end thereof for reversibly engaging the proximal leg of the wheelchair and having a lowered and a raised position, and a second arm having a second hook at the end thereof for reversibly engaging the distal leg of the wheelchair and being operatively connected to the first arm for movement between the raised and lowered positions therewith. The second arm has a retracted and an extended position relative to the first arm. A first motor reversibly moves the first and second arms between the raised and lowered positions for raising and lowering the wheelchair, and a second motor reversibly moves the second arm relative to the first arm to reversibly collapse the distal leg of the wheelchair against the proximal leg thereof. A method is provided including the steps of attaching the first arm of the assembly to the proximal leg of the wheelchair, extending the second arm and attaching the second arm to the distal leg of the wheelchair, pivoting the first arm upwardly to raise the first and second arms and the wheelchair attached thereto, and retracting the second arm relative to the first arm to collapse the legs of the wheelchair together.

24 Claims, 10 Drawing Figures

WHEELCHAIR DOCKAGE AND STORAGE SYSTEM

TECHNICAL FIELD

This invention relates to an assembly to be installed within a vehicle, such as a van or the like, for lifting and storing a wheelchair into the vehicle.

BACKGROUND OF THE INVENTION

Various means have been devised for maneuvering a wheelchair into and out of a vehicle. Some devices raise and lower the wheelchair with a person sitting in the wheelchair, while others carry the person, leaving the wheelchair to be stored by another person. For example, the U.S. Pat. Nos. 3,910,432 to Browne et al, and 4,015,725 to Ryan et al teach assemblies for lifting wheelchairs, the assemblies including gear and chain mechanisms. However, there are no assemblies which provide means for raising and folding a wheelchair into a vehicle.

STATEMENT OF THE INVENTION

In accordance with the present invention, there is provided an assembly for raising and collapsing a wheelchair having collapsible legs, the assembly including first leg engagement means for reversibly engaging the proximal leg of the wheelchair and having a lowered position and a raised position, and second leg engagement means for reversibly engaging the distal leg of the wheelchair and being operatively connected to the first leg engagement means for movement between the raised and lowered positions therewith. The second leg engagement means has a retracted and extended position relative to the first leg engagement means. Drive means reversibly moves the first and second leg engagement means between the raised and lowered positions for raising the wheelchair and reversibly moves the second leg engagement means from the extended position to the retracted position to reversibly collapse the distal leg of the wheelchair against the proximal leg. The instant invention further provides a method of raising and collapsing the wheelchair including the steps of attaching a first arm of the assembly to the proximal leg of the wheelchair and extending a second arm of the assembly and attaching it to the distal leg of the wheelchair. The first arm is pivoted upwardly to raise the first and second arms and the wheelchair attached thereto, and the second arm is then retracted relative to the first arm to collapse the legs of the wheelchair together.

FIGURES IN THE DRAWINGS

An embodiment of an assembly for raising and collapsing a wheelchair having collapsible legs constructed in accordance with the instant invention will now be described by way of example only, with reference to the accompanying drawings, in which.

DETAILED DESCRIPTION OF THE DRAWINGS

Figure 1:
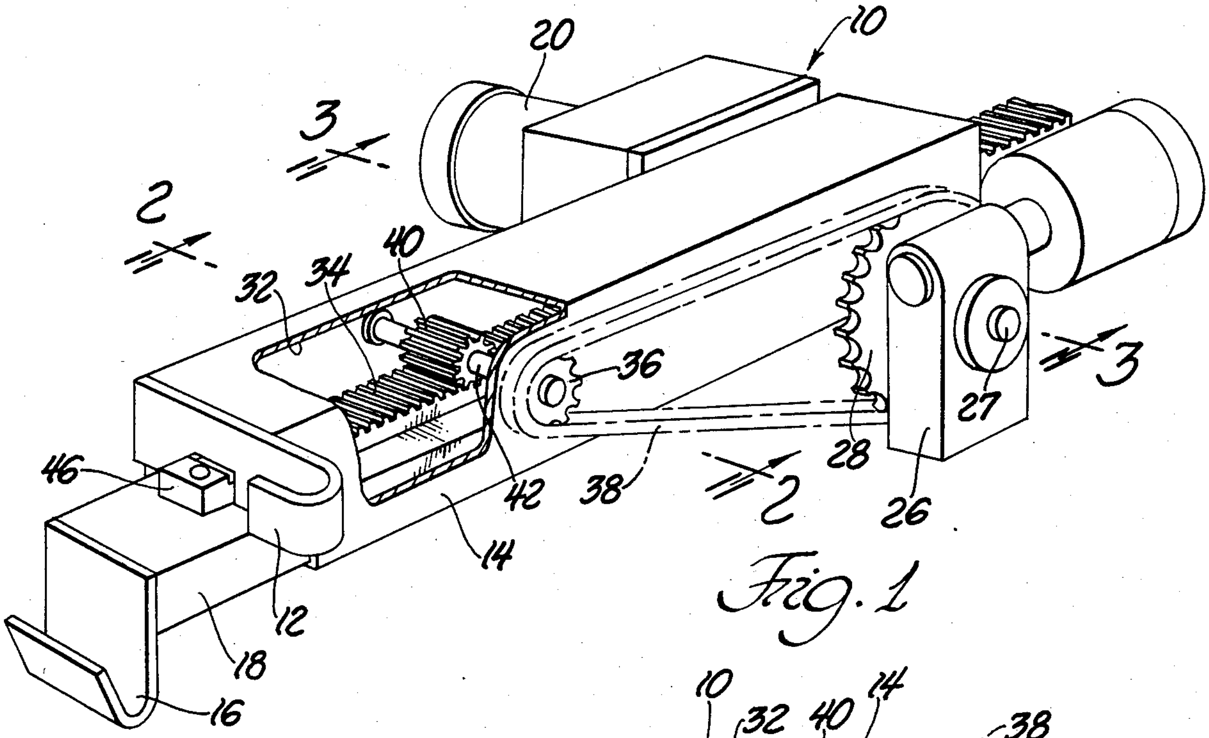
FIG. 1 is a perspective view of the instant invention.

An assembly for raising and collapsing a wheelchair constructed in accordance with the instant invention is generally shown at 10.

The assembly 10 includes first leg engagement means comprising a first hook 12 extending horizontally outwardly from and opening inwardly relative to the distal end of a first arm 14 and a second leg engagement means comprising a second hook 16 extending downwardly from an opening upwardly and outwardly relative to the distal end of a second arm 18. The first arm 14 is operatively connected to the second arm 18 for moving the hooks 12 and 16 between a raised and lowered position therewith, the second arm 18 having a retracted and extended position relative to the first arm 14 for extending and retracting the second hook 16 relative to the first hook 12. That is, the second arm 18 extends and retracts relative to the first arm 14 to extend and retract the second hook 16 relative to the first hook 12. The first arm 14 pivots with the second arm 18 to raise and lower the first and second hooks 12, 16.

The assembly 10 further includes drive means for reversibly moving the first and second hooks 12 and 16 between the raised and lowered positions for raising a wheelchair which is operatively connected thereto and for reversibly moving the second hook 16 from the extended position to the retracted position to reversibly collapse the wheelchair, as will be described below.

The drive means includes a gear drive motor 20 having a gear drive shaft 22 operatively connected to the first arm 14 for moving the first arm between the raised and lowered positions. The first arm 14 may be mounted on a mounting block 24, the mounting block 24 being fixedly mounted on the gear drive shaft 22 whereby rotation of the gear drive shaft 22 rotates the mounting block 24 and the first arm 14 to raise and lower the first and second hooks 12 and 16. The drive means further includes a sprocket drive motor 26 having a sprocket drive shaft 27 and a drive sprocket 28 operatively connected to the sprocket drive shaft 27. The gear drive shaft 22 is pivotally journalled or rotatably mounted within a bushing 30 disposed within the drive sprocket 28 for rotating movement relative thereto. The gear drive shaft 22 rotates independently of the drive sprocket 28 without actuating movement of the drive sprocket 28. The sprocket drive motor 26 drives the sprocket drive shaft 27, thereby rotating the sprocket 28. In operation, the gear drive motor 20 drives the gear drive shaft 22 to raise and lower the first and second arms 14 and 18, the gear drive shaft 22 rotating within bushing 30 and being supported by the sprocket 28 while rotating independently thereof. In other words, the sprocket 28 provides aupport means for supporting the distal end of the gear drive shaft 22.

Figure 2:
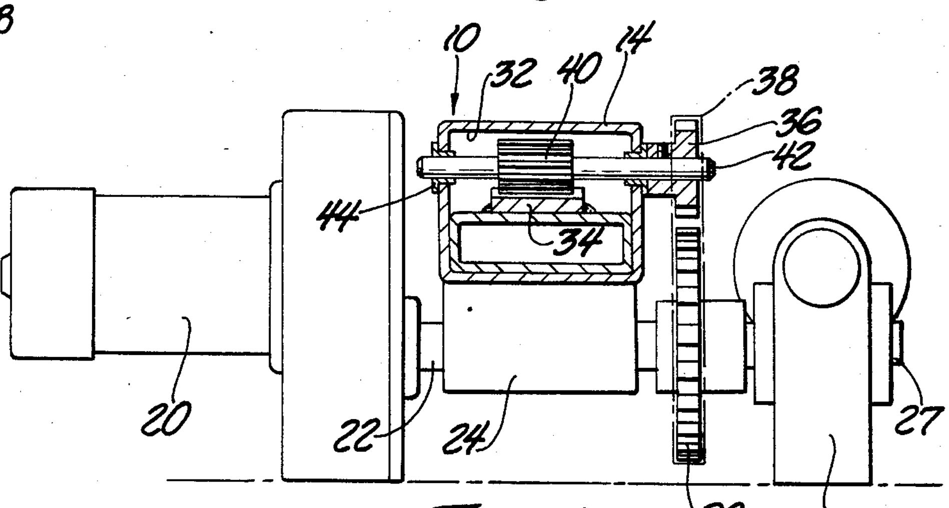
FIG. 2 is a cross sectional view taken substantially along line 2—2 of FIG. 1.
Figure 3:
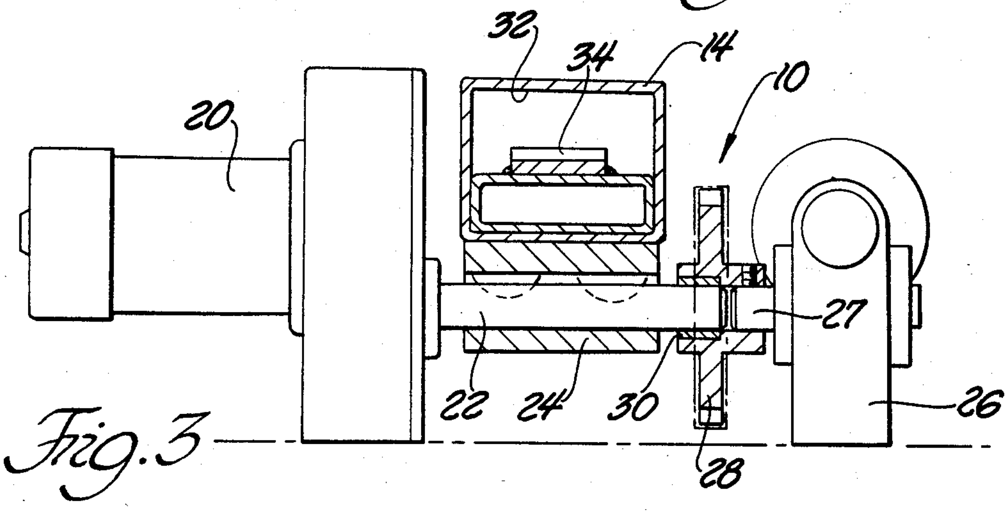
FIG. 3 is a cross sectional view taken substantially along line 3—3 of FIG. 1.

The first arm 14 includes a channel 32 extending axially therethrough as shown in FIGS. 1 through 3. The second arm 18 is slidably mounted within the channel 32 for movement between the extended and retracted positions. The second arm 18 includes gear means operatively connected to the drive sprocket 28 for actuating the sliding movement of the second arm 18 through the channel 32. The gear means includes a rack gear 34 disposed axially along the upper surface of the second arm 18, and a driven gear 36 operatively connected to the drive sprocket 28 by a belt or chain 38, and a pinion gear 40 operatively connected to the driven gear 36 by a shaft member 42. The shaft 42 is supported within the first arm 14 by bushing 44. The pinion gear 40 has radially extending teeth which engage teeth of the rack gear 34. Actuation of the pinion gear 40 by the sprocket drive motor 26 extends or retracts the second arm 18 by the coaction of the pinion gear 40 and rack gear 34.

The assembly 10 further includes sensor means for sensing when the second arm 18 is in the retracted position. The sensor means may comprise a pressure sensitive switch 46 which turns off the motors 20 and 26 when the second arm 18 is moved to the retracted position so as to bring the switch 46 in contact with the first hook 12.

The operation of the instant invention is best shown in FIGS. 4 through 10 and is best described by dividing the operation into five cycles.

Figure 4:
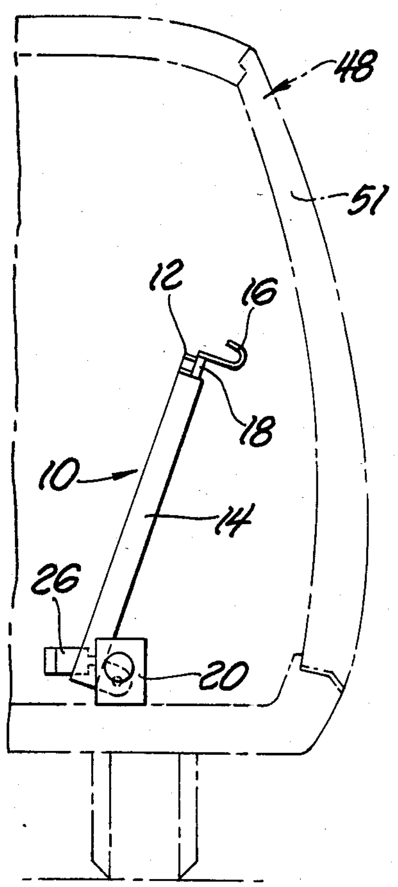
FIG. 4 is an elevational view of the instant invention disposed within a vehicle shown schematically in cross section.

As shown in FIG. 4, in cycle 1 the assembly 10 is initially within the inner compartment of an automobile or van which is schematically and generally shown at 48. The vehicle 48 has a doorway 50, a door 51 being movable between an opened and closed position within the doorway 50. The second arm 18 of the assembly 10 is in the retracted position within the first arm 14, and the first arm 14 and second arm 18 are in the raised position. A conventional wheelchair, generally indicated at 52, is brought to a position next to the doorway 50. The wheelchair 52 has a first leg 54 proximate to the vehicle 48 and a second leg 56 which is distal with respect to the vehicle 48. The legs 54 and 56 are connected together by scissor arms 58 which allow the wheelchair 52 to be collapsed.

Figure 5:
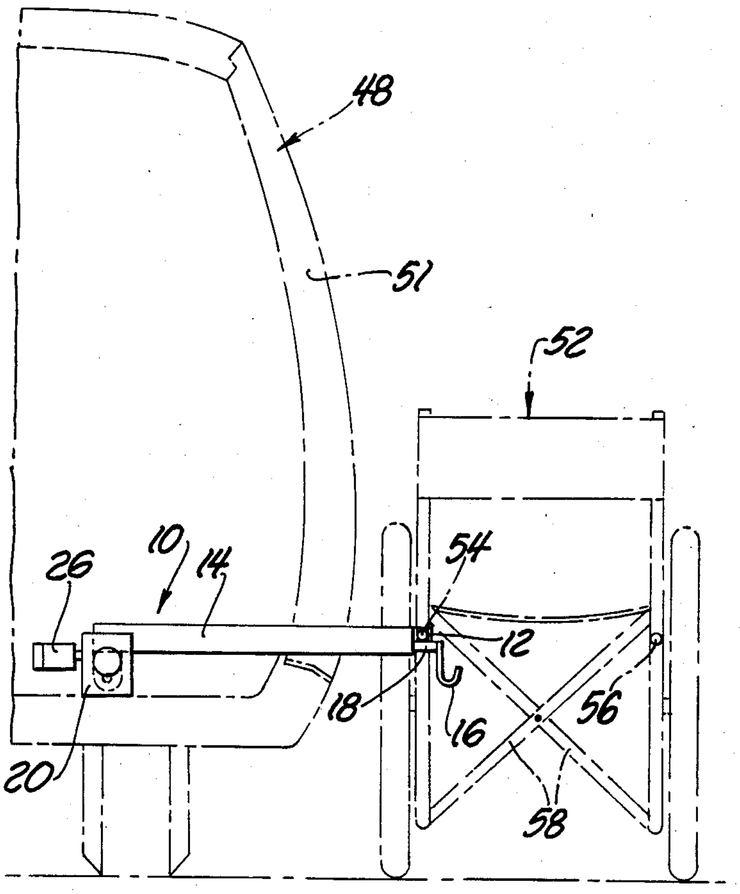
FIG. 5 is an elevational view of the instant invention disposed within the vehicle wherein a wheelchair is disposed adjacent to the vehicle.

As shown in FIG. 5, the first arm 14 and second arm 18 are moved to the lowered position by the gear motor 20, the sprocket drive motor 26 driving the pinion gear 40 in a counterclockwise direction thereby maintaining the second arm 18 in the retracted position. In other words, when the first arm 14 and second arm 18 are initially extending upwardly and are driven to the lowered position by the gear motor 20 while the sprocket drive motor 26 is not driving the pinion gear 40 (that is, the pinion gear is kept stationary), the result is that the second arm 18 will be extended as the first arm 14 is lowered. Similarly, when the second arm 18 is in the extended position, as the first arm 14 and second arm 18 are raised by the gear motor 20 and the pinion gear 40 is kept stationary, the result is that the second arm 18 will be retracted as the first arm 14 and second arm 18 are raised. Likewise, in order to maintain the second arm 18 in the retracted position while the gear motor 20 lowers the first arm 14 and second arm 18, the sprocket drive motor 26 must coincidentally drive the pinion gear 40 in a counter-clockwise direction. Similarly, the sprocket drive motor 26 must rotate the pinion gear 40 in a clockwise direction as the gear motor 26 raises the first arm 14 and second arm 18 to maintain the second arm 18 in a stationary position in relation to the first arm 14. The locking and unlocking of the sprocket drive motor 26 would be controlled by electrical switches.

Figure 6:
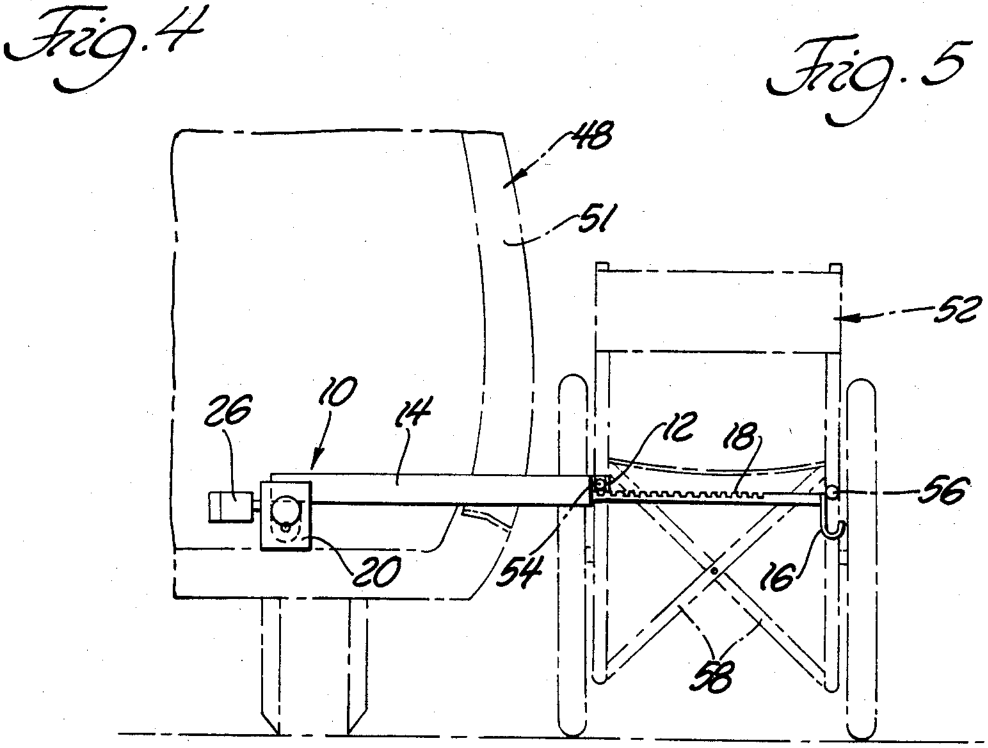
FIG. 6 is an elevational view of the instant invention disposed within the vehicle wherein the instant invention engages the wheelchair.

During the second cycle, as shown in FIG. 6, the first arm 14 is attached to the wheelchair 52 by connecting the first hook 12 of the first arm 14 to the proximal leg 54 of the wheelchair 52. The sprocket drive motor 26 is actuated to drive the pinion gear 40 in a clockwise direction thereby extending the second arm 18 to the extended position shown in FIGS. 6 and 10 for engagement of the second hook member 16 with the distal leg 56 of the wheelchair 52.

Figure 7:
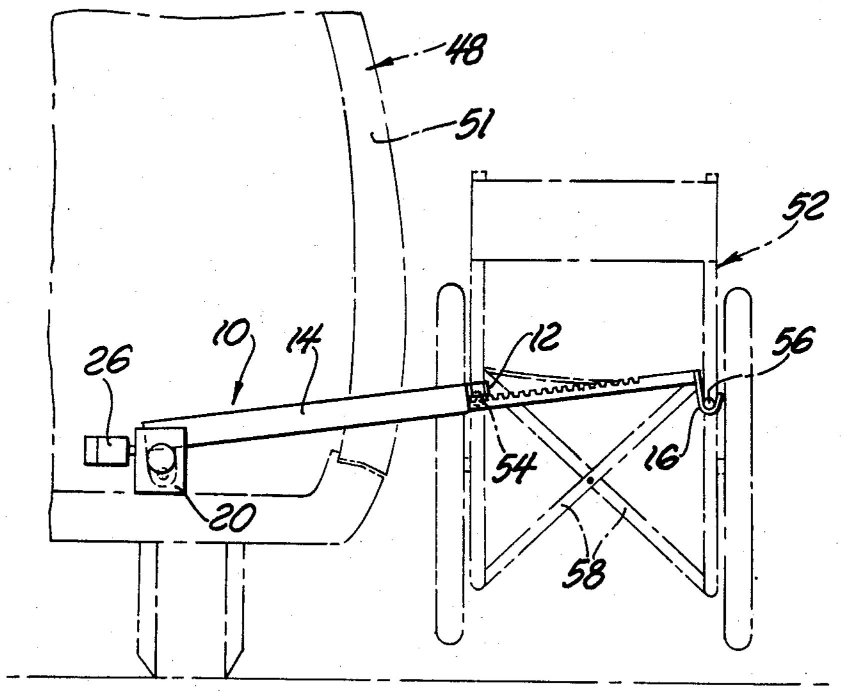
FIG. 7 is an elevational view of the instant invention disposed within the vehicle wherein the instant invention is raising the wheelchair.
Figure 8:
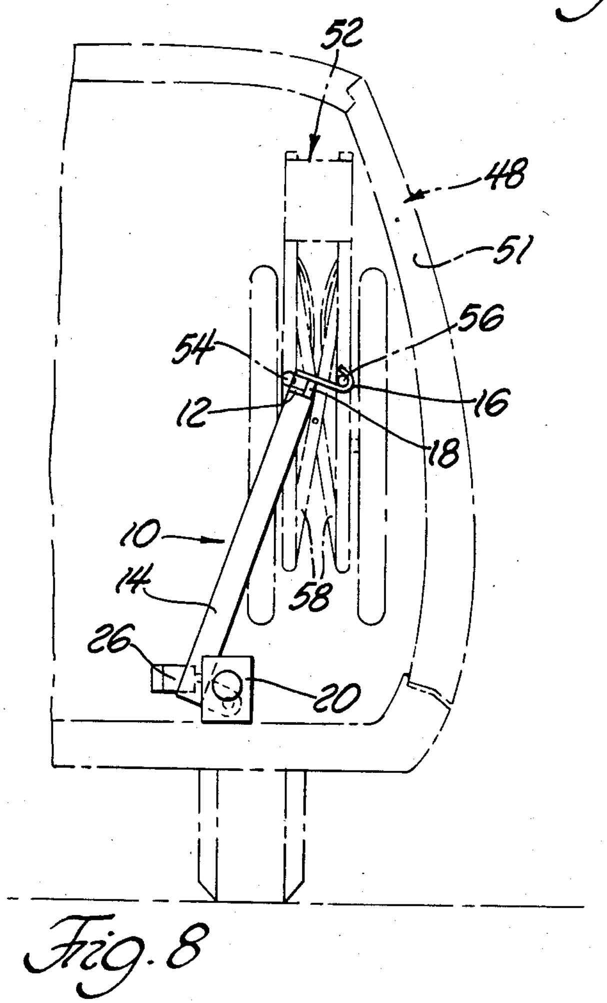
FIG. 8 is an elevational view of the instant invention disposed within the vehicle wherein the instant invention has raised and collapsed the wheelchair.
Figure 9:
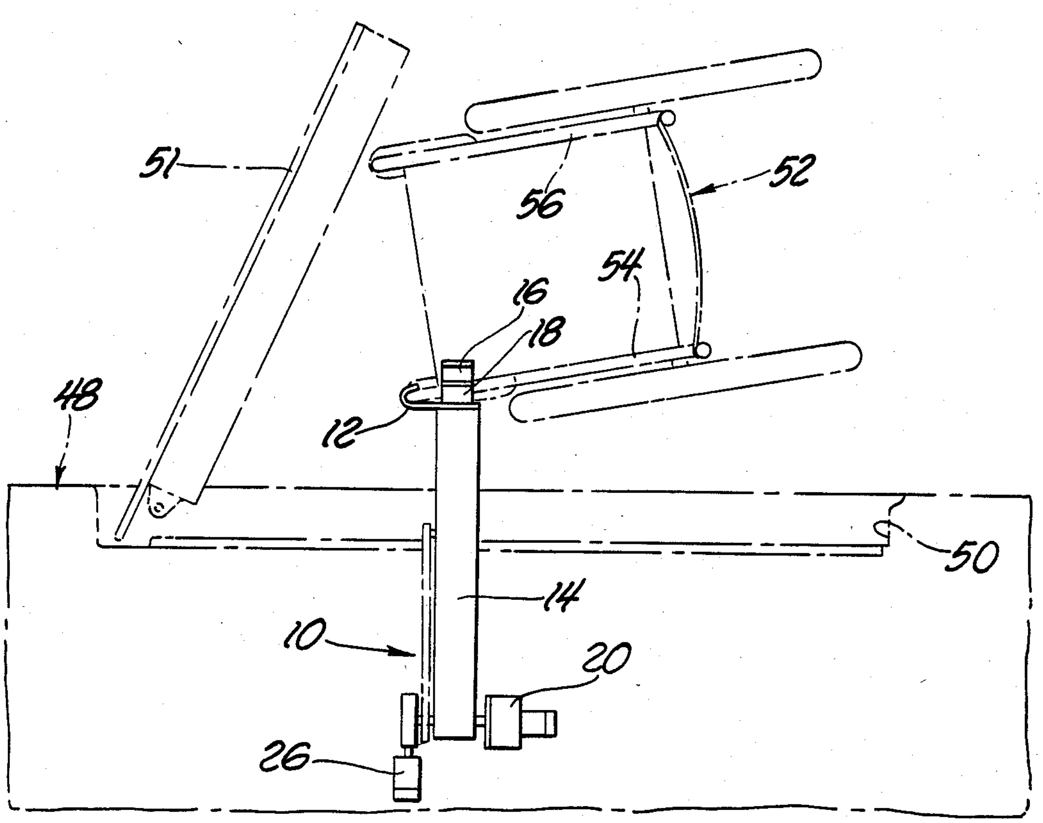
FIG. 9 is a plan view of the instant invention disposed within the vehicle wherein the wheelchair is disposed adjacent to the vehicle.
Figure 10:
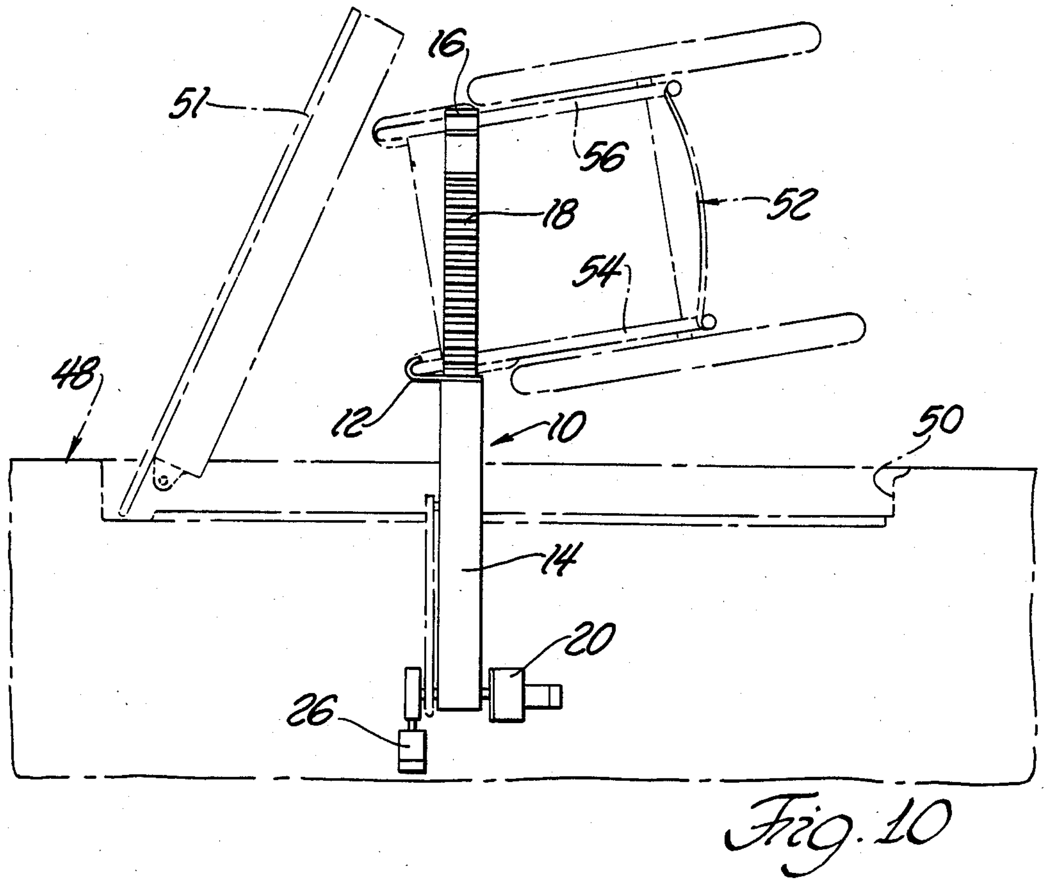
FIG. 10 is a plan view of the instant invention disposed within the vehicle wherein the instant invention engages the wheelchair.

During the third cycle of the operation, the gear motor 20 is actuated to pivot the first arm 14 and second arm 18 upwardly, as shown in FIG. 7. As the arms 14 and 18 are raised, the second hook member 16 extending from the end of the second arm 18 engages the distal leg 56 of the wheelchair 52, thereby lifting the wheelchair 52. As the second arm 18 is raised to the raised position, as shown in FIG. 8, the sprocket drive motor 26 is locked so that the pinion gear 40 remains stationary and, as described above, the second arm 18 is automatically retracted, thereby collapsing the wheelchair 52 to a storage position. The wheelchair 52 is now stored and folded within the vehicle 48 as shown in FIG. 8.

During cycle four, the wheelchair 52 is removed from the vehicle 48 by the gear motor 20 being driven to lower the first arm 14 and second arm 18. The sprocket drive motor 26 is locked as during cycle 3, thereby automatically extending the second arm 18 as previously described, and thereby unfolding the wheelchair 52. The second hook 16 is then disengaged from the distal leg 56 of the wheelchair 52, and the wheelchair 52 is backed away from the assembly 10, disengaging the first hook 12 from the first leg 54.

During cycle five, the gear motor 20 lifts the first arm 14 and second arm 18 to the raised position. The sprocket motor 26 is locked so that the second arm 18 is automatically retracted to its initial position as previously described.

Thus, the instant invention provides a method of raising and collapsing the wheelchair 52 by attaching the first arm 14 to the proximal leg 54 of the wheelchair 52, extending the second arm 18 and attaching the second arm 18 to the distal leg 56 of the wheelchair 52, pivoting the first arm 14 and second arm 18 upwardly to raise the wheelchair 52 attached thereto, and retracting the second arm 18 relative to the first arm 14 to collapse the legs 54 and 56 of the wheelchair 52 together.

The invention has been described in an illustrative manner, and it is to be understood that the terminology which has been used is intended to be in the nature of words of description rather than limitation. Obviously, many modifications and variations of the present invention are possible in light of the above teachings. It is, therefore, to be understood that, within the scope of the appended claims, the invention may be practiced otherwise than as specifically described.

The embodiments of the invention in which an exclusive property or privilege is claimed are defined as follows:

1. An assembly for raising and collapsing a wheelchair having collapsible legs, said assembly comprising:

first leg engagement means for reversibly engaging the proximal leg of the wheelchair and having a lowered position and a raised position;

second leg engagement means for reversibly engaging the distal leg of the wheelchair and being operatively connected to said first leg engagement means for movement between said raised and lowered positions therewith, said second leg engagement means having a retracted and extended position relative to said first leg engagement means; and drive means for reversibly moving said first and second leg engagement means between said raised and lowered positions for raising the wheelchair and for reversibly moving said second leg engagement means from said extended position to said retracted position to reversibly collapse the distal leg of the wheelchair against the proximal leg.

2. An assembly as described in claim 1 including a first arm pivotally mounted for moving said first and second leg engagement means between said raised and lowered positions and a second arm having said second leg engagement means connected thereto and being mounted on said first arm and axially movable relative thereto for moving said second leg engagement means between said extended and retracted positions.

3. An assembly as described in claim 2 wherein said drive means includes a gear drive motor having a gear drive shaft operatively connected to said first arm for moving said first and second arm engagement means between said raised and lowered positions.

4. An assembly as described in claim 3 wherein said gear drive shaft includes a distal end, said assembly including support means for supporting said distal end.

5. An assembly as described in claim 4 includng a mounting block, said first arm being fixedly mounted on said mounting block and said mounting block being fixedly mounted on said gear drive shaft whereby rotation of said gear drive shaft rotates said mounting block and said first arm to raise and lower said first and second leg engagement means.

6. An assembly as described in claim 5 wherein said drive means further includes a sprocket drive motor and a drive sprocket operatively connected thereto and being operatively connected to said second arm for extending and retracting said second arm relative to said first arm.

7. An assembly as described in claim 6 wherein said drive sprocket includes said support means for pivotally supporting said distal end of said gear drive shaft.

8. An assembly as described in claim 7 wherein said drive sprocket is operatively connected to said sprocket drive motor for rotation about an axis, said support means including a pocket in said sprocket gear, said pocket defining a substantially cylindrical opening circumscribed about said axis, said distal end of said gear drive shaft being pivotally journalled within said pocket for rotating movement relative thereto.

9. An assembly as described in claim 7 wherein said second arm includes gearing means operatively connected to said drive sprocket for actuating movement of said second arm.

10. An assembly as described in claim 9 wherein said second arm has a substantially planar upper surface, said gearing means including a rack gear disposed axially along said upper surface of said second arm and a driven gear operatively connected to said drive sprocket and a pinion gear operatively connected to said driven gear, said pinion gear reversibly engaging said rack gear.

11. An assembly as described in claim 10 wherein said first arm includes a channel extending axially therethrough, said second arm being slidably mounted within said channel for movement between said extended and retracted positions.

12. An assembly as described in claim 11 wherein said first arm includes a first distal end and said second arm including a second distal end, said first leg engagement means including a first hook extending horizontally outwardly from and opening inwardly relative to said distal end of said first arm and said second leg engagement means includes a second hook extending downwardly from and opening upwardly and outwardly relative to said distal end of said second arm.

13. An assembly as described in claim 12 wherein said second arm includes sensor means for sensing when said second arm is in said retracted position.

14. An assembly as described in claim 2 wherein said drive means includes a sprocket drive motor and a drive sprocket operatively connected thereto, said assembly including gearing means operatively connected between said drive sprocket and said second arm for actuating movement of said second arm.

15. An assembly as described in claim 14 wherein said gearing means includes a rack gear disposed axially along the upper surface of said second arm and a driven gear operatively connected to said drive sprocket and a pinion gear operatively connected to said driven gear, said pinion gear reversibly engaging said rack gear.

16. An assembly as described in claim 15 wherein said first arm includes a channel extending axially therethrough, said second arm being slidably mounted within said channel for movement between said first and second positions.

17. An assembly as described in claim 16 wherein said first leg engagement means includes a hook extending horizontally outwardly from and opening inwardly relative to the distal end of said first arm and said second leg engagement means includes a second hook extending downwardly from and opening upwardly and outwardly relative to the distal end of said second arm.

18. An assembly as described in claim 17 wherein said second arm includes sensor means for sensing when said second arm is in said retracted position.

19. An assembly as described in claim 2 wherein said first arm includes a channel extending axially therethrough, said second arm being slidably mounted within said channel for movement between said first and second positions.

20. An assembly as described in claim 2 wherein said first leg engagement means includes a hook extending horizontally outwardly from said opening inwardly relative to the distal end of said first arm and said second leg engagement means includes a second hook extending downwardly from and opening upwardly and outwardly relative to the distal end of said second arm.

21. A method of raising and collapsing a wheelchair having collapsible legs with a dockage and storage assembly including a pivotally mounted first arm having a first hook extending from the end thereof and a second arm axially slidably mounted relative to the first arm for movement between an extended and retracted position, said method comprising the steps of;

attaching the first arm to the proximal leg of the wheelchair, extending the second arm and attaching the second arm to the distal leg of the wheelchair, pivoting the first arm upwardly to raise the first and second arms and the wheelchair attached thereto, and retracting the second arm relative to the first arm to collapse the legs of the wheelchair together.

22. A method as described in claim 21 wherein the first arm includes a first hook at the end thereof and the second arm includes a second hook at the end thereof, said method further defined by the steps of hooking the first hook onto the proximal leg of the wheelchair and hooking the second hook onto the second leg of the wheelchair to connect the first and second arms to the legs of the wheelchair.

23. A method as described in claim 21 including the steps of driving a pinion gear operatively connected to a rack gear mounted on the second arm to move the second arm to the extended position.

24. A method as described in claim 23 including the steps of locking the pinion gear in a stationary position while raising the first arm to retract the second arm relative to the first arm while raising the first arm simultaneously.

* * * * *